United States Patent
Toma et al.

(10) Patent No.: US 8,045,292 B2
(45) Date of Patent: Oct. 25, 2011

(54) PERPENDICULAR MAGNETIC RECORDING HEAD WITH THE RETURN YOKE LAYER HAVING GRADUALLY INCREASING THE WIDTH

(75) Inventors: Yusuke Toma, Niigata-ken (JP); Kiyoshi Kobayashi, Niigata-ken (JP); Toru Takahashi, Niigata-ken (JP); Hiroshi Kameda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 962 days.

(21) Appl. No.: 11/943,938

(22) Filed: Nov. 21, 2007

(65) Prior Publication Data
US 2008/0174911 A1 Jul. 24, 2008

(30) Foreign Application Priority Data
Nov. 30, 2006 (JP) ................................. 2006-324288
Mar. 13, 2007 (JP) ................................. 2007-063632

(51) Int. Cl.
G11B 5/147 (2006.01)
(52) U.S. Cl. .................................................... 360/125.2
(58) Field of Classification Search ............. 360/125.17, 360/125.19, 125.2, 125.21, 125.02, 125.16, 360/125.26
See application file for complete search history.

(56) References Cited

U.S. PATENT DOCUMENTS

| 2004/0179297 | A1* | 9/2004 | Kameda ........................ 360/126 |
| 2004/0240108 | A1* | 12/2004 | Shukh ........................... 360/125 |
| 2005/0008360 | A1 | 1/2005 | Gomi |
| 2005/0219764 | A1* | 10/2005 | Kameda et al. ............... 360/313 |
| 2006/0256472 | A1* | 11/2006 | Hirabayashi et al. ......... 360/126 |

FOREIGN PATENT DOCUMENTS
JP 2005-122831 5/2005
* cited by examiner

Primary Examiner — Jefferson Evans
(74) Attorney, Agent, or Firm — Brinks Hofer Gilson & Lione

(57) ABSTRACT

A perpendicular magnetic recording head is provided capable of suppressing the magnetic field attributable to the edge write phenomenon and improving resistance to an external magnetic field. The perpendicular magnetic recording head includes a magnetic layer that has a main magnetic pole on a surface facing a recording medium; a return yoke layer that is disposed on the magnetic layer with a nonmagnetic layer disposed therebetween and has a large width in the direction of the main magnetic pole; and a coil layer for applying a recording magnetic field to the magnetic layer. The return yoke layer is provided with such a shape that as seen in the plan view, the return yoke layer is exposed from the medium facing surface with a width not greater than the width in the track width direction of a protrusion region of the return yoke layer that covers the coil layer and the width of the return yoke layer gradually increases in the height direction from the medium facing surface.

4 Claims, 9 Drawing Sheets

HEIGHT DIRECTION

TRACK WIDTH DIRECTION

PERPENDICULAR MAGNETIC RECORDING HEAD WITH THE RETURN YOKE LAYER HAVING GRADUALLY INCREASING THE WIDTH

RELATED APPLICATIONS

This application claims the benefit of priority under 35 U.S.C. §119 to Japanese Patent Application Nos. 2006-324288 filed Nov. 30, 2006 and 2007-063632 filed Mar. 13, 2007, the contents of which are hereby incorporated by reference in their entirety.

BACKGROUND

1. Field of the Invention

The present invention relates to a perpendicular magnetic recording head that records information on a recording medium by applying a magnetic field in a direction perpendicular to a medium facing surface.

2. Description of the Related Art

A perpendicular magnetic recording head has a laminated structure in which a return yoke layer is provided on a medium facing surface that faces a recording medium with a nonmagnetic insulating layer disposed on a main magnetic pole layer. The main magnetic pole layer and the return yoke layer are magnetically connected to each other at a portion disposed closer to the starting point of the height direction than the medium facing surface. A coil layer is buried in the nonmagnetic insulating layer so as to apply a recording magnetic field to the main magnetic pole layer and the return yoke layer. In a magnetic head having such a configuration, when current is supplied to the coil layer, a recording magnetic field is induced between the main magnetic pole layer and the return yoke layer. The recording magnetic field is incident perpendicularly from the medium facing surface of the main magnetic pole layer to a hard film of the recording medium and returns to the return yoke layer after passing a soft film of the recording medium. Accordingly, information is recorded on a region of the recording medium opposed to the main magnetic pole layer (see JP-A-2005-122831 (Patent Document 1).

The return yoke layer and a shield layer of the perpendicular magnetic recording head are typically formed of a substantially rectangular thin-film magnetic body. When an external magnetic field is applied in the height direction, magnetic flux is concentrated on edges of the thin film. At this time, the height directional magnetization component becomes dominant, causing rewriting (edge write phenomenon) of previously recorded information. That is, in order to suppress the magnetic field attributable to the edge write phenomenon, it is necessary to decrease the height directional component of the magnetic field generated from the edges of the return yoke layer or the shield layer.

SUMMARY

The present invention provides a perpendicular magnetic recording head capable of suppressing the magnetic field attributable to the edge write phenomenon and improving resistance to an external magnetic field.

According to a first aspect of the present disclosure, there is provided a shielded perpendicular magnetic recording head including: a magnetic layer that has a main magnetic pole on a surface facing a recording medium; a return yoke layer that is disposed on the magnetic layer with a nonmagnetic layer disposed therebetween and has a large width in the direction of the main magnetic pole; and a coil layer for applying a recording magnetic field to the magnetic layer. The return yoke layer is provided with such a shape that as seen in the plan view, the return yoke layer is exposed from the medium facing surface with a width not greater than the width in the track width direction of a protrusion region of the return yoke layer that covers the coil layer and the width of the return yoke layer gradually increases as it goes toward the starting point of the height direction.

In the above aspect of the perpendicular magnetic recording head of the present invention, the return yoke layer may be provided with such a shape that as seen in the plan view, a neck portion is exposed from the medium facing surface with a width and the width of the return yoke layer gradually increases as it goes toward the starting point of the height direction.

In one aspect of the above perpendicular magnetic recording head of the present disclosure, an insulating layer may be disposed between the return yoke layer and the coil layer, and the insulating layer may extend to or the vicinity of the end portion in the track width direction of the return yoke layer that is exposed from the medium facing surface.

According to a second aspect of the present disclosure, there is provided a shielded perpendicular magnetic recording head including: a magnetic layer that has a main magnetic pole on a surface facing a recording medium; a return yoke layer that is disposed on the magnetic layer with a nonmagnetic layer disposed therebetween and has a large width in the direction of the main magnetic pole; and a coil layer for applying a recording magnetic field to the magnetic layer. An insulating layer is disposed between the return yoke layer and the coil layer, and the insulating layer extends to or the vicinity of the end portion in the track width direction of the return yoke layer that is exposed from the medium facing surface. With such a configuration, it is possible to improve the resistance to the external magnetic field applied in the track width direction and the height direction.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DESCRIPTION OF THE EMBODIMENTS

Exemplary embodiments may be better understood with reference to the drawings, but these examples are not intended to be of a limiting nature. Like numbered elements in the same or different drawings perform equivalent functions.

Figure 1:
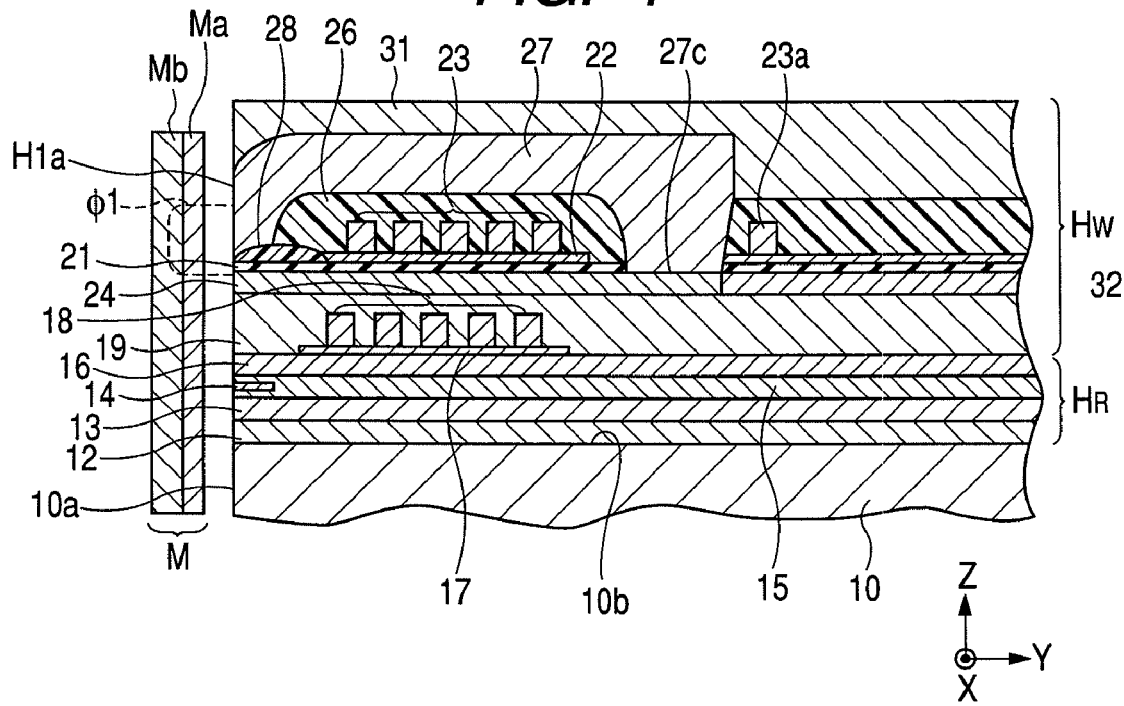
FIG. 1 is a longitudinal cross-sectional view of a magnetic head including a perpendicular magnetic recording head according to an embodiment of the present disclosure.
Figure 2:
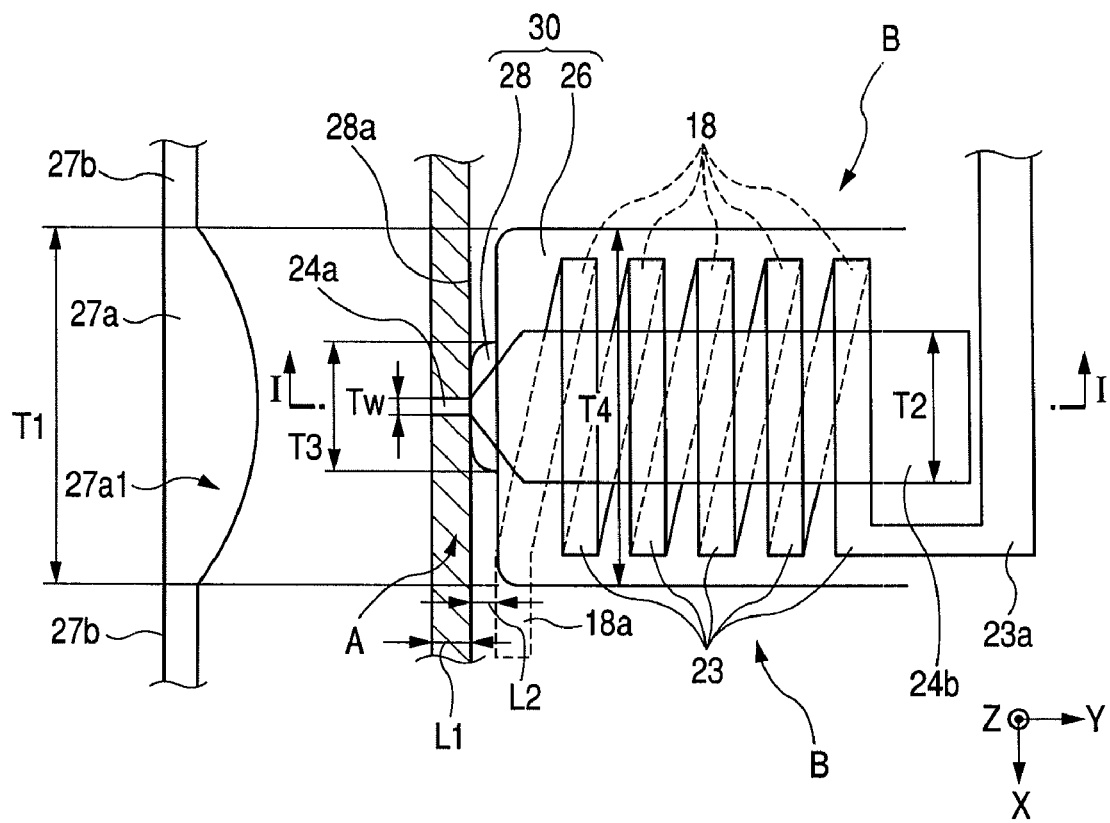
FIG. 2 is a fragmentary plan view of the perpendicular magnetic recording head and a fragmentary front view of a return yoke layer shown in FIG. 1.

FIG. 1 is a longitudinal cross-sectional view of a magnetic head including a perpendicular magnetic recording head according to an embodiment of the present disclosure. FIG. 2 is a fragmentary plan view of the perpendicular magnetic recording head and a fragmentary front view of a return yoke layer shown in FIG. 1. In FIG. 1, the X direction represents a track width direction, the Y direction represents a height direction, and the Z direction represents a film thickness direction. Each direction is orthogonal to the other two directions. In the present embodiment, a magnetic layer having a slit formed therein is configured as the return yoke layer.

The perpendicular magnetic recording head Hw shown in FIG. 1 magnetizes a hard film Ma of a recording medium M in a perpendicular direction by applying a perpendicular magnetic field to the recording medium M. The recording medium M has a disc shape, for example, and includes a hard film Ma having high remanent magnetization and a soft film Mb having high magnetic permeability. The recording medium M rotates about the center of the disc shape.

A slider 10 is formed of a nonmagnetic material such as $Al_2O_3$ and TiC. An opposed surface 10a of the slider 10 is opposed to the recording medium M. The slider 10 is levitated from the surface of the recording medium M, or the slider 10 slides over the recording medium M by the airflow generated on the surface when the recording medium M rotates. A nonmagnetic insulating layer 12 formed of an inorganic material such as $Al_2O_3$ or $SiO_2$ is provided on a trailing end face (top surface) 10b of the slider 10. A reading unit HR is provided on the nonmagnetic insulating layer 12.

The reading unit HR includes a lower shield layer 13 disposed on the nonmagnetic insulating layer 12, an upper shield layer 16 disposed on the lower shield layer 13 with an inorganic insulating layer (gap insulating layer) 15 disposed therebetween. These shield layers 13 and 16 have a large width in the direction of a main magnetic pole. A reading element 14 is disposed within the inorganic insulating layer 15. The reading element 14 may be a magneto-resistance effect element, such as an AMR (anisotropic magneto-resistance) element, a GMR (giant magneto-resistance) element, and a TMR (tunnel magneto-resistance) element.

A plurality of lower coil chips 18 made of a conductive material is formed on the upper shield layer 16 with a coil insulating foundation layer 17 disposed therebetween. The lower coil chip 18 is made of one or more kinds of metal materials selected from Au, Ag, Pt, Cu, Cr, Al, Ti, NiP, Mo, Pd, Rh, and Ni. Alternatively, the lower coil chip 18 may have a laminated structure in which layers of the nonmagnetic metal materials are laminated onto each other.

A coil insulating layer 19 made of an inorganic insulating material such as $Al_2O_3$ or an organic insulating material such as a resist is formed in the vicinity of the lower coil chip 18. The top surface of the insulating layer 19 is planarized and a plating foundation layer (not shown) is formed thereon. A main magnetic pole layer 24 is provided on the plating foundation layer. An insulating layer 32 made of $Al_2O_3$ or $SiO_2$ is buried in the vicinity of the main magnetic pole layer 24. Therefore, the top surfaces of the main magnetic pole layer 24 and the insulating layer 32 are planarized to be the same surface. The main magnetic pole layer 24 is formed by plating and is formed of a ferromagnetic material having high saturation magnetic flux density, such as NiFe, CoFe, or NiFeCo.

As shown in FIG. 2, the main magnetic pole layer 24 includes an elongated front portion 24a that has a width equal to the track width Tw and extends from an opposed surface Hi a of the recording medium (the opposed surface H1a is formed on substantially the same surface as the opposed surface 10a of the slider 10) in a height direction (Y direction in the drawing), and a rear portion 24b that has a width in the track width direction (X direction in the drawing) larger than that of the front portion 24a at the rear side in the height direction of the front portion 24a. The maximum width of the rear portion 24b is T2.

As shown in FIG. 1, a nonmagnetic gap layer 21 made of an inorganic material such as $Al_2O_3$ or $SiO_2$ is formed on the main magnetic pole layer 24. An upper coil chip 23 is formed on the gap layer 21 with a coil insulating foundation layer 22 disposed therebetween. Because the gap layer 21 serves as the insulating foundation layer of the upper coil chip 23, the coil insulating foundation layer 22 may not be formed. The upper coil chip 23 is provided in plural and formed of a conductive material, in a manner similar to the lower coil chip 18. The upper coil chip 23 is formed of one or more kinds of metal materials selected from Au, Ag, Pt, Cu, Cr, Al, Ti, NiP, Mo, Pd, Rh, and Ni. Alternatively, the upper coil chip 23 may have a laminated structure in which layers of the nonmagnetic metal materials are laminated onto each other.

The lower coil chip 18 and the upper coil chip 23 are arranged in a solenoid coil shape, as shown in FIG. 2, in which the end portion in the track width direction (X direction in the drawing) of the lower coil chip 18 and the upper coil chip 23 are electrically connected to each other. The lower coil chip 18 and the upper coil chip 23 include extension portions 18a and 23a, respectively so that current is supplied to the solenoid coil from the extension portions 18a and 23a.

A coil insulating layer 26 made of an inorganic insulating material such as $Al_2O_3$ or an organic insulating material such as a resist is formed on the upper coil chip 23. In the present embodiment, a separation adjustment insulating layer 28 made of an inorganic material or an organic material is formed on the gap layer 21. A front edge 28a of the coil insulating layer 26 overlaps with the separation adjustment insulating layer 28. As shown in FIG. 2, the front edge 28a of the separation adjustment insulating layer 28 extends linearly in a direction substantially parallel to the track width direction (X direction in the drawing). The front edge 28a of the separation adjustment insulating layer 28 is separated from the opposed surface H1a by a predetermined distance (gap depth) L1 in the height direction. As shown in FIG. 2, the separation adjustment insulating layer 28 is extended long in the track width direction (X direction in the drawing). In the present embodiment, the width T3 of the front edge 28a of the separation adjustment insulating layer 28 is set smaller than the maximum width T2 of the main magnetic pole layer 24. Alternatively, the width T3 of the front edge 28a of the separation adjustment insulating layer 28 may be set larger than the maximum width T2 of the main magnetic pole layer 24.

In the case where a solenoid coil layer is used, because the width of the upper coil chip 23 in the track width direction is larger than the maximum width T2 of the main magnetic pole layer 24, the maximum width T4 of the coil insulating layer 26 that covers the upper coil chip 23 is larger than the maximum width T2 of the main magnetic pole layer 24. The separation adjustment insulating layer 28 is made, for example, of an organic insulating material and is formed by thermal curing. The coil insulating layer 26 that partially overlaps with the separation adjustment insulating layer 28 and extends in the height direction is also made of an organic insulating material and is formed by thermal curing. The top surface of the coil insulating layer 26 disposed close to the opposed surface H1a is formed convexly in a curved surface shape that starts at the top surface of the separation adjustment insulating layer 28. The separation adjustment insulating layer 28 and the coil insulating layer 26 (hereinafter, these two layers may be referred to as "insulating layer 30") is formed convexly in an upper direction (Z direction in the drawing) from a reference plane when the top surface of the gap layer 21 is defined as the reference plane. The top surface of the gap layer 20 is exposed in the vicinity of the insulating layer 30. Hereinafter, a region between the front edge 28a of the separation adjustment insulating layer 28 and the opposed surface H1a is referred to as a front region A, and the regions on opposite sides of the insulating layer 30 in the track width direction (X direction in the drawing) are referred to as the opposed regions B.

As shown in FIGS. 1 and 2, a return yoke layer 27 (second magnetic layer) made of a magnetic material, such as a permalloy, is formed on the front region A, the insulating layer 30, and the opposed regions B. As shown in FIG. 1, the rear end portion in the height direction of the return yoke layer 27 is formed as a connection portion 27c that is magnetically connected to the main magnetic pole layer 24. The return yoke layer 27 is covered with a protective layer 31 made of an inorganic insulating material. The second magnetic layer may be configured simply as a shield layer that does not have the connection portion 27c, that is, the second magnetic layer is not magnetically coupled with the main magnetic pole. The return yoke layer 27 has a large width in the direction of the main magnetic pole.

The return yoke layer 27 includes a central portion 27a and opposed end portion 27b positioned on opposite sides of the central portion 27a in the track width direction (X direction in the drawing). The central portion 27a is formed at a position opposed to the main magnetic pole layer 24 in the film thickness direction (Z direction in the drawing). As shown in FIGS. 1 and 2, a protrusion portion 27a1 is formed in the central portion 27a so as to protrude upward from the insulating layer 30 across the front region A. Because the insulating layer 30 is formed more convexly than the opposed regions B, the return yoke layer 27 formed on the insulating layer 30 is protruded out further than the return yoke layer 27 formed on the opposed regions B. In this case, the thickness of the return yoke layer 27 formed on the insulating layer 30 is substantially the same as that of the return yoke layer 27 formed on the opposed regions B. The thickness of the return yoke layer 27 is preferably set in the range of 0.1 μm to 1.0 μm in order to suppress the PTP (pole tip protrusion) phenomenon. The protrusion portion 27a1 tends to protrude further out if the distance, L1+L2 in FIG. 2 is small, for example, not greater than 2 μm. When the width T3 of the front edge 28a of the separation adjustment insulating layer 28 is set larger than T1, the width of the protrusion portion 27a1 in the track width direction is increased by the width of the separation adjustment insulating layer 28.

Figure 3:
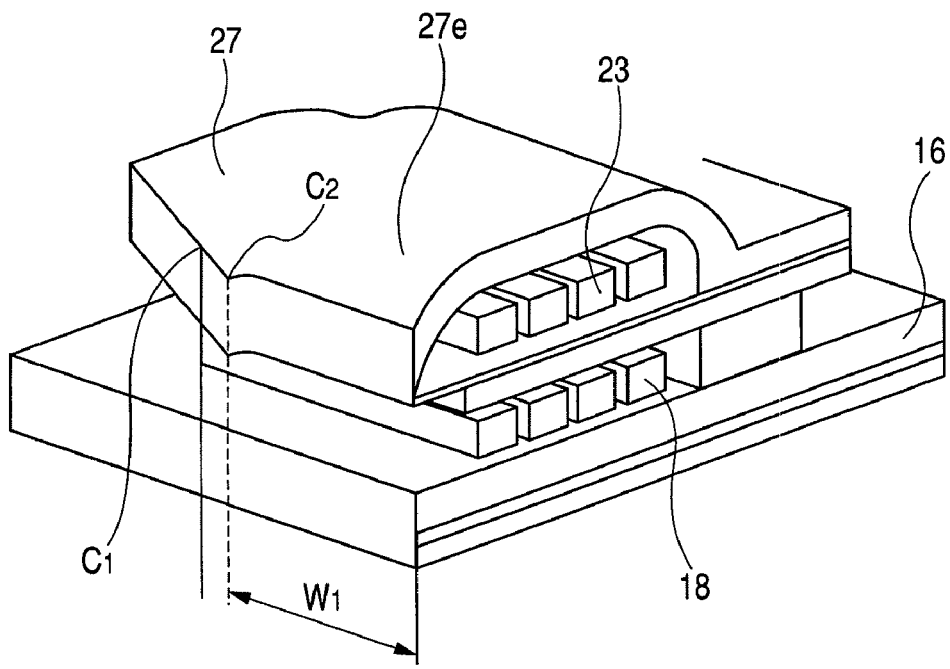
FIG. 3 is a perspective view of the return yoke layer of the perpendicular magnetic recording head shown in FIG. 1.
Figure 4A:
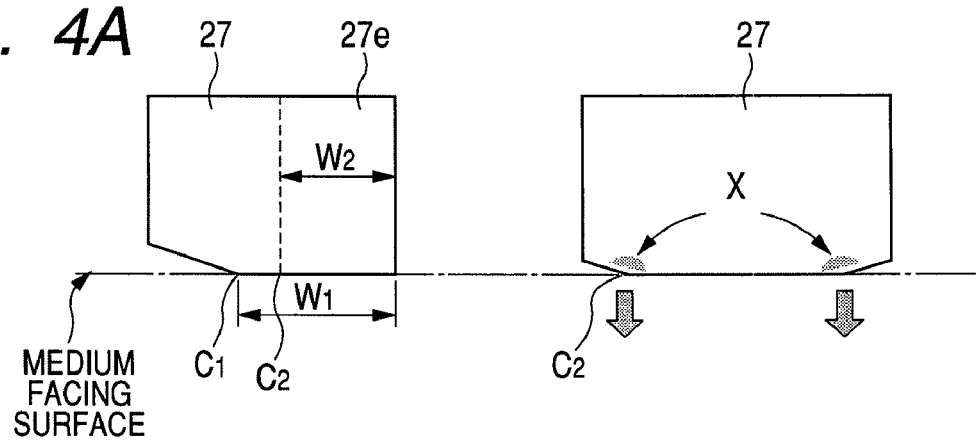
FIGS. 4A and 4B are diagrams for explaining concentration of magnetic flux in a magnetic layer.
Figure 4B:
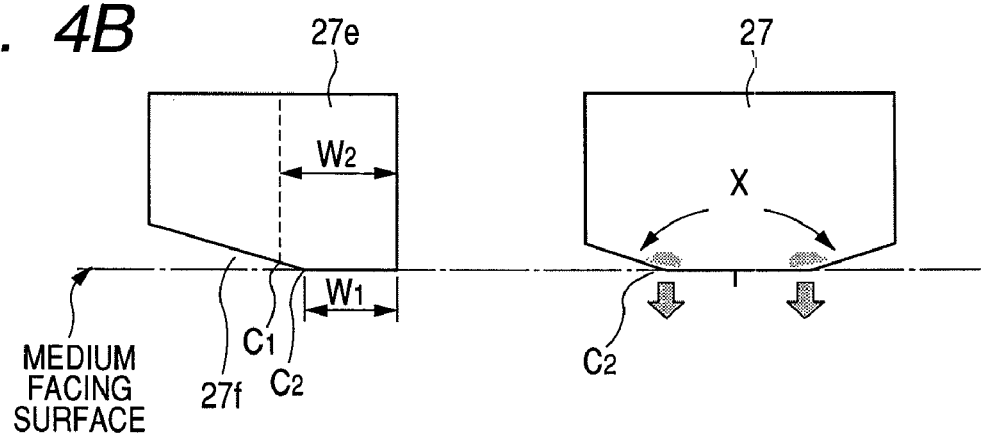

The return yoke layer 27 of the perpendicular magnetic recording head of the present invention has a so-called shielded pole structure in which the coil layer is covered with a protrusion region 27e, as shown in FIG. 3. The protrusion region 27e has a substantially arch shape that follows the shape of the coil insulating layer 26. In the present invention, it is assumed that the protrusion region 27e is defined to start at a portion of the return yoke layer 27 that protrudes following the protruding shape of the coil insulating layer 26. FIG. 3 and FIGS. 4A and 4B (particularly, those on the left side of FIGS. 4A and 4B) illustrate a left half portion of the return yoke layer 27 cut at the center of the device.

As shown in FIG. 4B, the return yoke layer 27 of the perpendicular magnetic recording head of the present invention is provided with such a shape that as seen in the plan view, the return yoke layer 27 is exposed from a medium facing surface with a width W1 not greater than the width W2 in the track width direction of the protrusion region 27e that covers the coil layer, and that the width of the return yoke layer 27 gradually increases as it goes toward the starting point of the track width direction. That is, the return yoke layer 27 includes a cut regions (front edge cuts) 27f that starts at a position located closer to the center of the device than the starting point C1 of the protrusion region 27e. The return yoke layer 27 is typically formed of a substantially rectangular thin-film magnetic body. When the front edge cuts 27f are provided in the return yoke layer 27 and an external magnetic field is applied in the height direction to the return yoke layer 27, as shown in FIG. 4A, magnetic flux is concentrated on the edges of the front edge cuts 27f (the symbol "X" indicates a magnetic flux concentrated portion). In this case, demagnetizing field is increased in the protrusion region 27e that has a substantially arch shape.

That is, the present inventors have found that suppression of the magnetic field attributable to the edge write phenomenon and improved resistance to an external magnetic field can be achieved by taking advantage of demagnetizing field which may be generated by providing a substantially arch-like shape to the return yoke layer that is a thin magnetic film.

The demagnetizing field Hd is a magnetic field having a magnetization direction opposite to that of the magnetic field generated within the magnetic body at the same time with the magnetization of the magnetic body. In an orthogonal coordinate system, the demagnetization coefficients typically satisfy the relation of $Nx+Ny+Nz=1$.

If the thickness of the magnetic body is substantially equal to zero, it can be thought that the demagnetization coefficients Nx and Ny of the magnetic body is zero and Nz is 1. In this case, when an external magnetic field is applied in the axial direction where the magnetization easily occurs, the magnetic body is easily magnetized, generating a large amount of magnetic field. On the other hand, when an external magnetic field is applied in the axial direction where the magnetization hardly occurs, the magnetic body is hardly magnetized, generating a small amount of magnetic field.

Figure 5A:
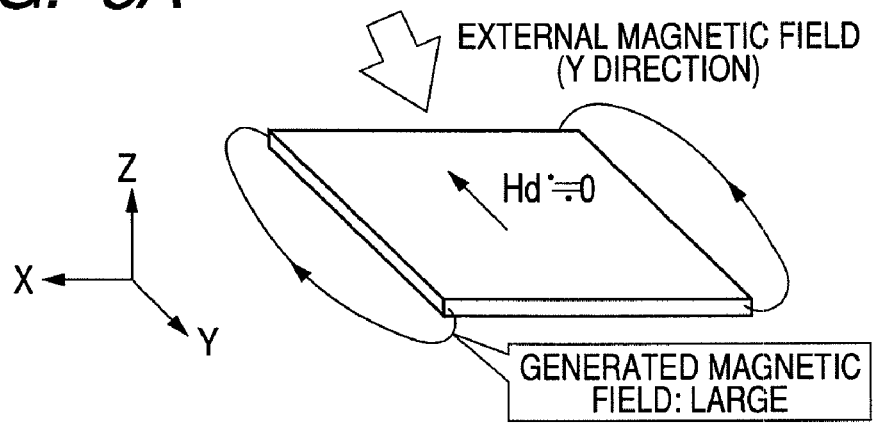
FIGS. 5A to 5C are diagrams for explaining principles of the present disclosure.
Figure 5B:
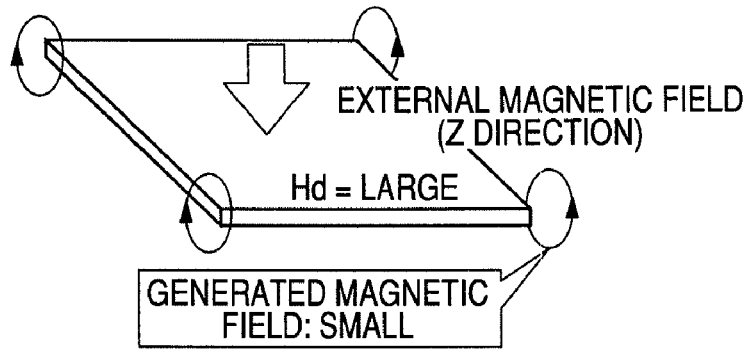
Figure 5C:
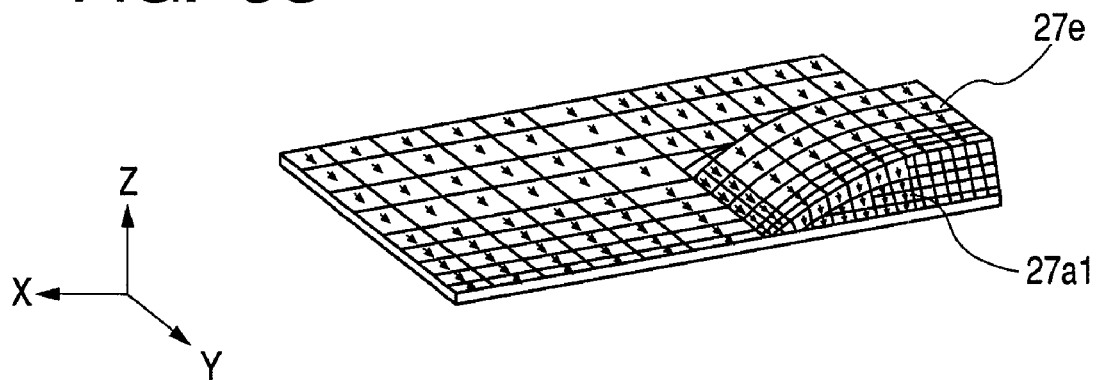

The above-described principles can be similarly applied to the return yoke layer 27 of the perpendicular magnetic recording head. As shown in FIG. 5C, by providing the protrusion region 27e, it is possible to change the magnetization state from the state shown in FIG. 5A to the state shown in FIG. 5B, increasing the amount of demagnetizing field in the height direction. That is, when the protrusion region 27e is provided, the amount of demagnetizing field generated on the surface of the protrusion portion 27a1 is increased so that the magnetic flux concentrated portion is positioned at the protrusion region 27e.

The present inventors have found that by forming the return yoke layer 27 in such a shape that the return yoke layer 27 is exposed from the medium facing surface with a width W1 not greater than the width W2 in the track width direction of the protrusion region 27e that covers the coil layer and that the width of the return yoke layer 27 gradually increases as it goes toward the starting point of the track width direction, it is possible to position the magnetic flux concentrated portion at the edges of the protrusion region where the demagnetizing field is large. Therefore, it is possible to suppress the edge write phenomenon.

In this case, as shown in FIG. 4B, if the width W1 between the starting point C2 of the front edge cut 27f and the center of the device is smaller than the width W2 in the track width direction of the protrusion region 27e, the configuration of the front edge cut 27f is not particularly limited. The configuration of the front edge cut 27f is determined such that the return yoke layer 27 has a sufficient shield effect on the main magnetic poly layer 24 while suppressing the edge write phenomenon. Preferably, twice the width W1 of the return yoke layer 27 exposed from the medium facing surface is set in the range of 10 μm to 20 μm.

As described above, in the perpendicular magnetic recording head, the return yoke layer 27 is provided with such a shape that as seen in the plan view, the return yoke layer 27 is exposed from a medium facing surface with a width W1 not greater than the width W2 in the track width direction of the protrusion region 27e that covers the coil layer, and that the width of the return yoke layer 27 gradually increases as it goes toward the starting point of the track width direction. In the perpendicular magnetic recording head, magnetic flux is concentrated at the starting point (C2 on the medium facing surface) of the front edge cut 27f (see FIG. 4B). For this reason, it is possible to position the magnetic flux concentrated portion at the substantially arch-like portion where the demagnetizing field is large in the return yoke layer 27, decreasing the amount of the height-directional magnetization component. Accordingly, it is possible to suppress the edge write phenomenon.

Figure 6:
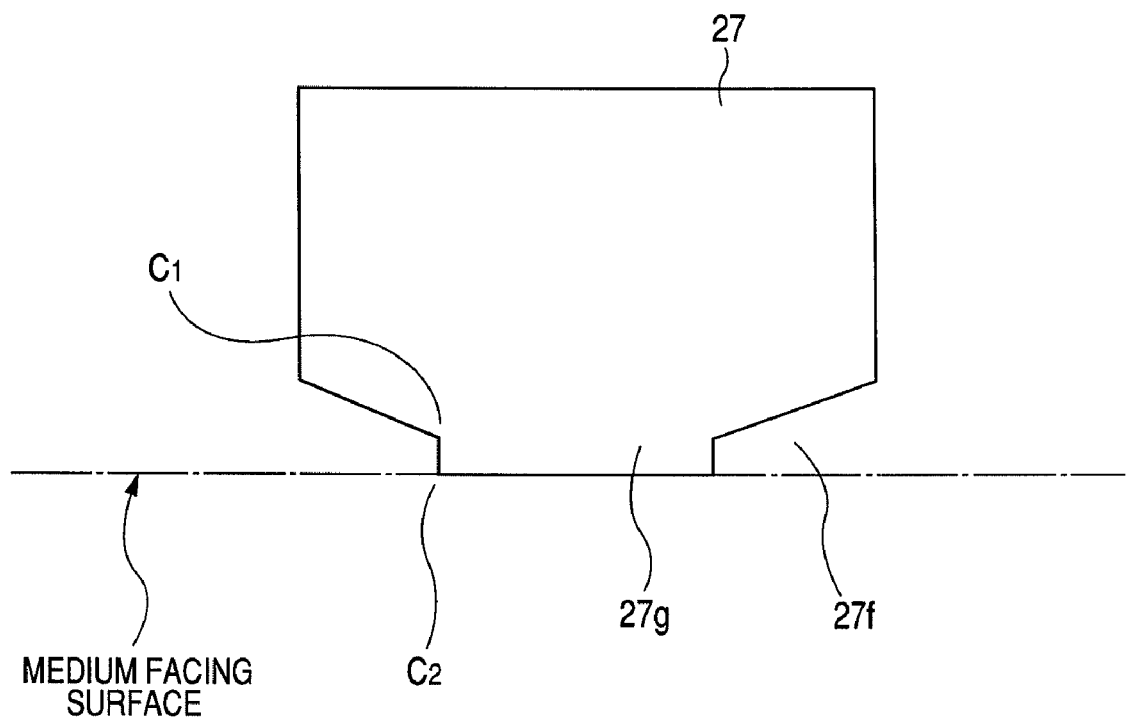
FIG. 6 is a plan view illustrating another example of the return yoke layer of the perpendicular magnetic recording head shown in FIG. 1.

The shape of the front edge cut 27f is not limited to the shape shown in FIG. 4B but can be modified in various manners. For example, as shown in FIG. 6, the return yoke layer 27 may have such a shape that as seen in the plan view, a neck portion 27g is exposed from the medium facing surface with a width and the width of the return yoke layer 27 gradually increases as it goes toward the starting point of the track width direction. In this case, as seen in the plan view, the starting point C1 of the protrusion region is located substantially at the same position as the starting point C2 of the front edge cut 27f in the track width direction. Even in such a case, it is possible to position the magnetic flux concentrated portion at the substantially arch-like portion where the demagnetizing field is large in the return yoke layer 27, decreasing the amount of the height-directional magnetization component. Accordingly, it is possible to suppress the edge write phenomenon.

EXAMPLE

Next, Examples that were conducted to clarify the advantages of the present invention will be described.

In the Examples, a static magnetic field simulation was performed. In the simulation, the magnetization state of the perpendicular magnetic recording head at the application time of external magnetic field was calculated by modeling those portions that are affected by external magnetic field. The maximum value of the magnetic field strength among the magnetic field strength distribution of the height directional component generated from the return yoke layer 27 was used as the maximum magnetic field strength. The magnetic field strength distribution of the height directional component was measured on a surface located at the central portion in the film thickness direction of the recording magnetic film.

Figure 7A:
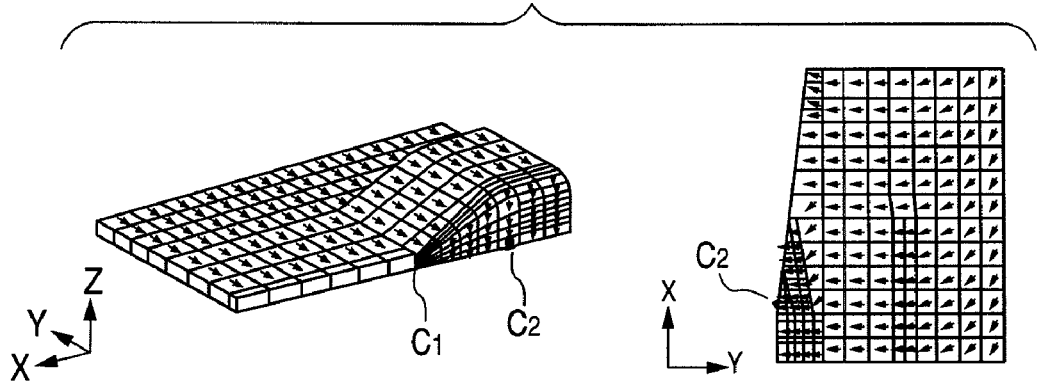
FIGS. 7A to 7C are vector diagrams of a flux density in the return yoke layer.
Figure 7B:
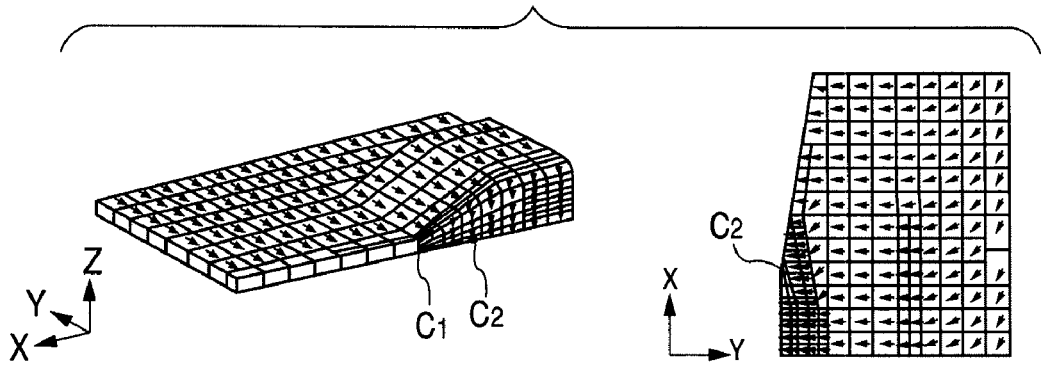
Figure 7C:
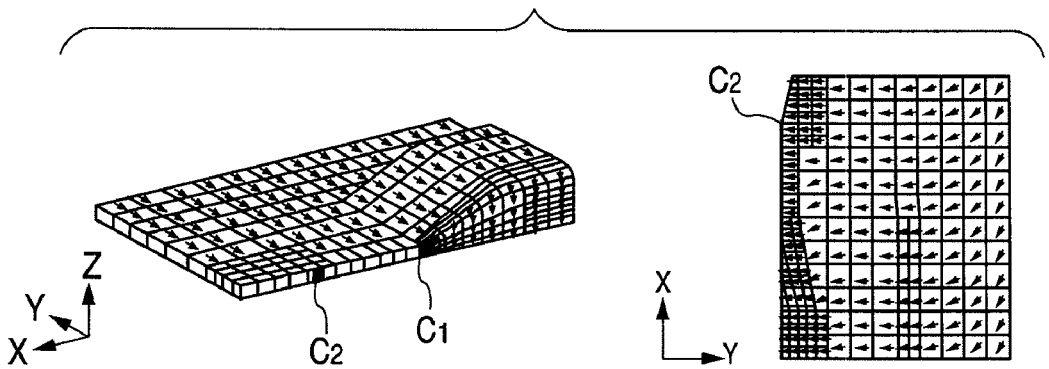
Figure 8:
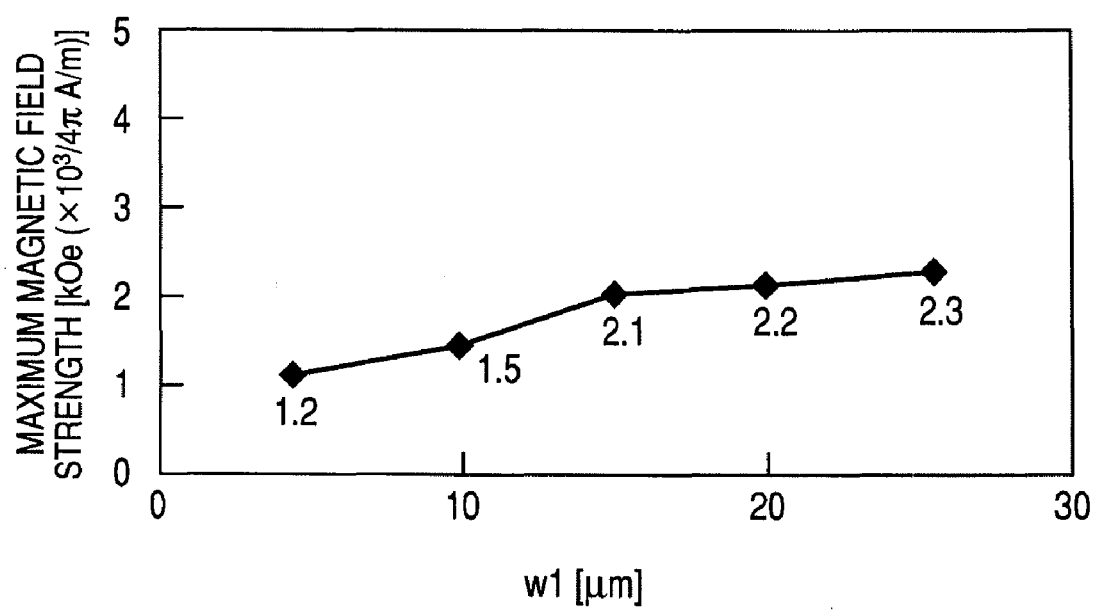
FIG. 8 is a diagram showing magnetic characteristics of the perpendicular magnetic recording head.

The maximum magnetic field strength was measured from the magnetic head including the perpendicular magnetic recording head in which the return yoke layer is provided with such a shape that as seen in the plan view, the return yoke layer is exposed from the medium facing surface with a width not greater than the width in the track width direction of the protrusion region that covers the coil layer and that the width of the return yoke layer gradually increases as it goes toward the starting point of the track width direction. In this case, the width W1 shown in FIG. 4B was 5 μm for Example 1, and the width W1 was 10 μm for Example 2. The measurement results are shown in FIG. 8. The magnetization directions in the return yoke layers of the perpendicular magnetic recording heads of Examples 1 and 2 are shown in FIGS. 7A and 7B, respectively. In FIGS. 7A and 7B, the left diagrams are perspective views of the return yoke layer, and the right diagrams are top views thereof. As a Comparative Example, the maximum magnetic field strength was measured from the magnetic head including the perpendicular magnetic recording head in which the return yoke layer is provided with such a shape as shown in FIG. 4A that as seen in the plan view, the return yoke layer is exposed from the medium facing surface with a width (W1=25 μm) greater than the width in the track width direction of the protrusion region that covers the coil layer and that the width of the return yoke layer gradually increases as it goes toward the starting point of the height direction. The measurement results are shown in FIGS. 7C and 8. FIGS. 7A to 7C are vector diagrams of a flux density.

As can be seen from FIGS. 7A and 7B, in the magnetic heads (Examples 1 and 2) including the perpendicular magnetic recording head of the present invention, the magnetic flux was concentrated on the starting point C2 of the front edge cut that is located closer to the center of the device than the starting point C1 of the protrusion region. Moreover, as shown in FIG. 8, the magnetic field strength (1.2 kOe and 1.5 kOe for Examples 1 and 2, respectively) measured was far smaller than 2 kOe ($\times 10^3/4\pi$ A/m). That is, it can be seen that the edge write phenomenon is sufficiently suppressed. On the other hand, in the Comparative magnetic head, the magnetic flux was concentrated on the starting point C2 of the front edge cut that is located further away from the center of the device than the starting point C1 of the protrusion region. Moreover, as shown in FIG. 8, the magnetic field strength (2.3 kOe) measured was far greater than 2 kOe ($\times 10^3/4\pi$ A/m). That is, it can be seen that the edge write phenomenon is likely to occur depending on the coercive force Hc of the recording medium.

The return yoke layer 27 may be provided with a thick edge portion or a substantially arch-like shape on its end portion in the track width direction. With such a configuration, the edge write phenomenon can be suppressed in a more secure manner. The thick edge portion can be formed by using a known method that is described in Japanese Patent Application No. 2006-199726, filed by the present applicant. Specifically, a resist layer is formed on a gap layer including a coil insulating foundation layer and an upper coil chip, and a return yoke layer is formed on the resist layer by a plating treatment. Thereafter, the edge portion of the return yoke layer is subjected to an additional plating treatment, forming a thick film portion. The substantially arch-like shape can be formed by using a known method that is described in Japanese Patent Application No. 2006-199726, filed by the present applicant. Specifically, a first resist layer is formed on a gap layer including a coil insulating foundation layer and an upper coil chip, and a second resist layer is formed on a portion where an arch-like portion is to be formed. Thereafter, a plating treatment is performed on the second resist layer, forming a return yoke layer. The return yoke layer is formed in an arch-like shape that follows the shape of the second resist layer. The disclosure of the Patent Application is incorporated herein for reference.

To improve the resistance to the external magnetic field in the track width direction and in the height direction, the present inventors have investigated a configuration in which as seen in the plan view, the coil insulating layer 26 disposed between the return yoke coil layer 27 and the upper coil chip 23 extends to or the vicinity of the end portion in the track width direction of the return yoke layer 27 where the magnetic field is concentrated.

Figure 9A:
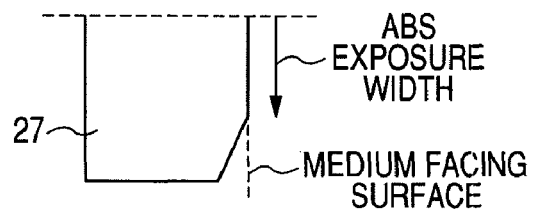
FIG. 9A is a diagram showing the shape of the return yoke layer.
Figure 9B:
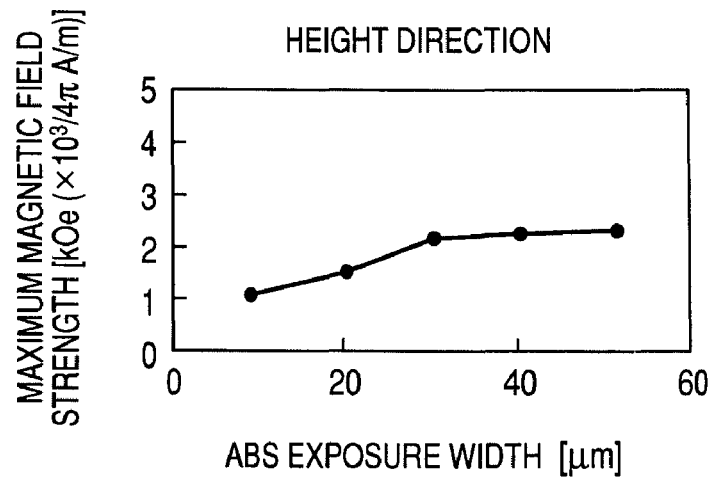
FIG. 9B is a diagram showing the relation between an ABS exposure width in a height direction and a maximum magnetic field strength.
Figure 9C:
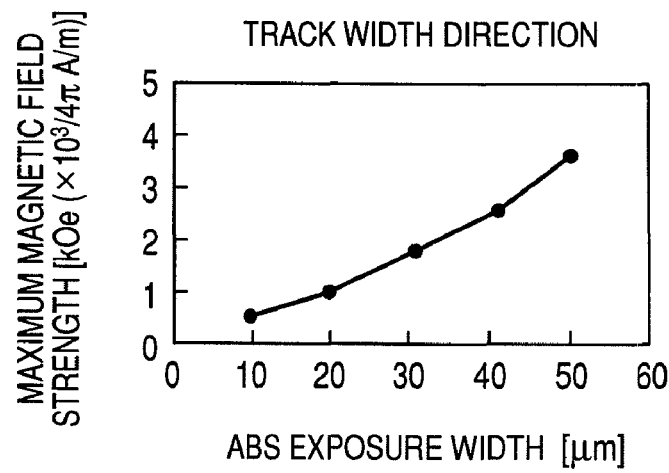
FIG. 9C is a diagram showing the relation between an ABS exposure width in a track width direction and a maximum magnetic field strength.

A return yoke layer 27 was used having a shape as shown in FIG. 9A (in which the width of the return yoke layer 27 gradually increased as it goes toward the starting point of the height direction). The length in the track width direction of the coil insulating layer 26 disposed between the return yoke layer 27 and the upper coil chip 23 was set to 20 µm. The maximum magnetic field strength in the height direction and in the track width direction was measured while changing an ABS exposure width (the width of the return yoke layer exposed from the medium facing surface) in FIG. 9A. The measurement results are shown in FIGS. 9B and 9C. The magnetic field strength was measured in the same manner as described above.

As can be seen from FIGS. 9B and 9C, when the ABS exposure width was not greater than 20 µm, that is, when the length in the track width direction of the coil insulating layer 26 as seen in the plan view was not smaller than the ABS exposure width, the resistance to the external magnetic field was improved in the track width direction and the height direction. This is thought to be due to the fact that because the coil insulating layer 26 is extended to the end portion of the return yoke layer 27, the amount of demagnetizing field is increased at the end portion, increasing the effect of suppressing the influence of external magnetic field.

Figure 10A:
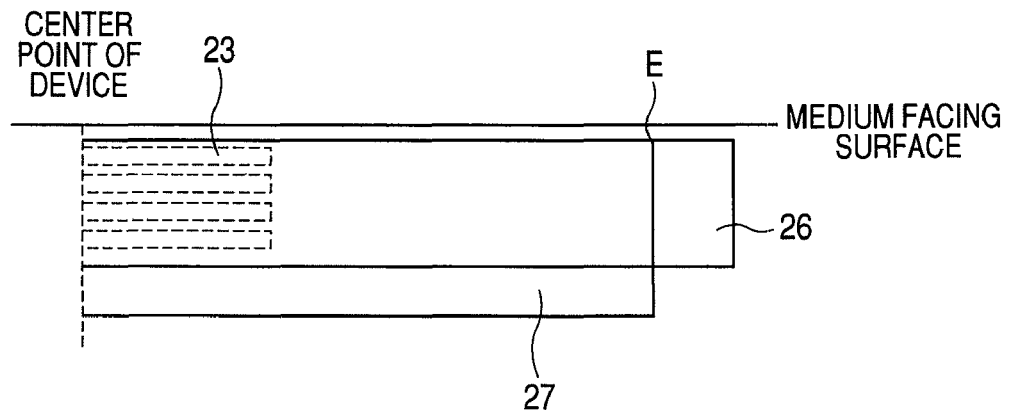
FIGS. 10A to 10C are diagrams showing the shape of the return yoke layer and a coil insulating layer.
Figure 10B:
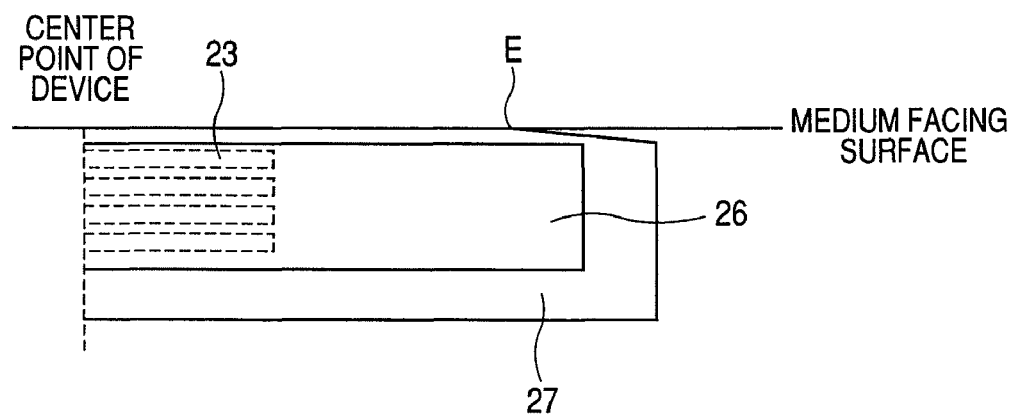
Figure 10C:
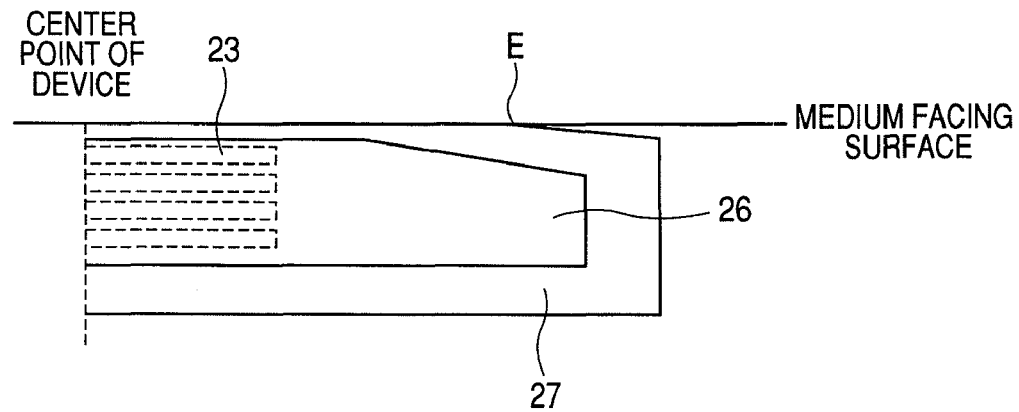
Figure 11A:
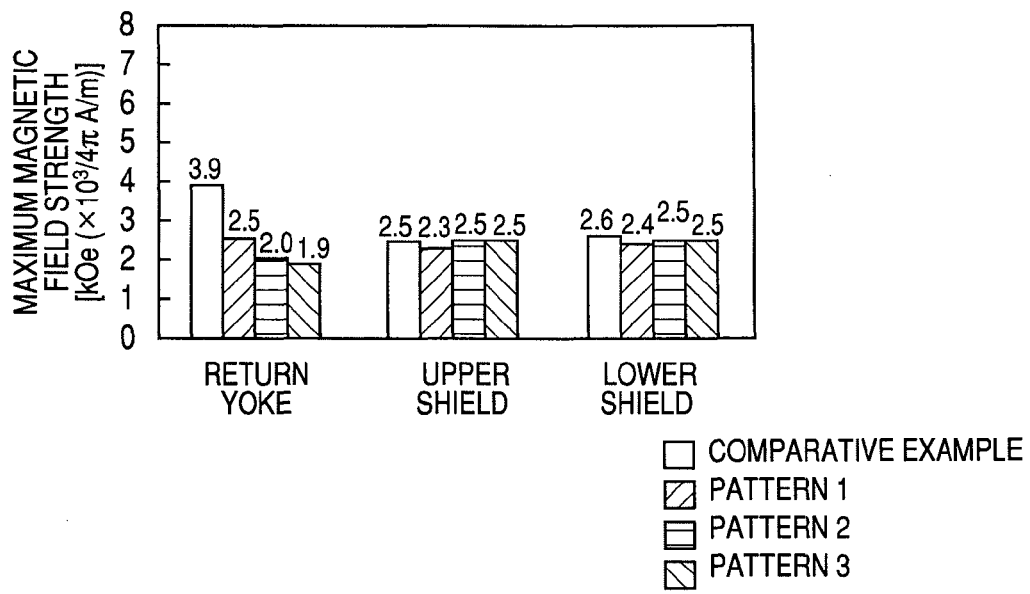
FIG. 11A is a diagram showing a maximum magnetic field strength in a height direction for each shape of the return yoke layer and the coil insulating layer.
Figure 11B:
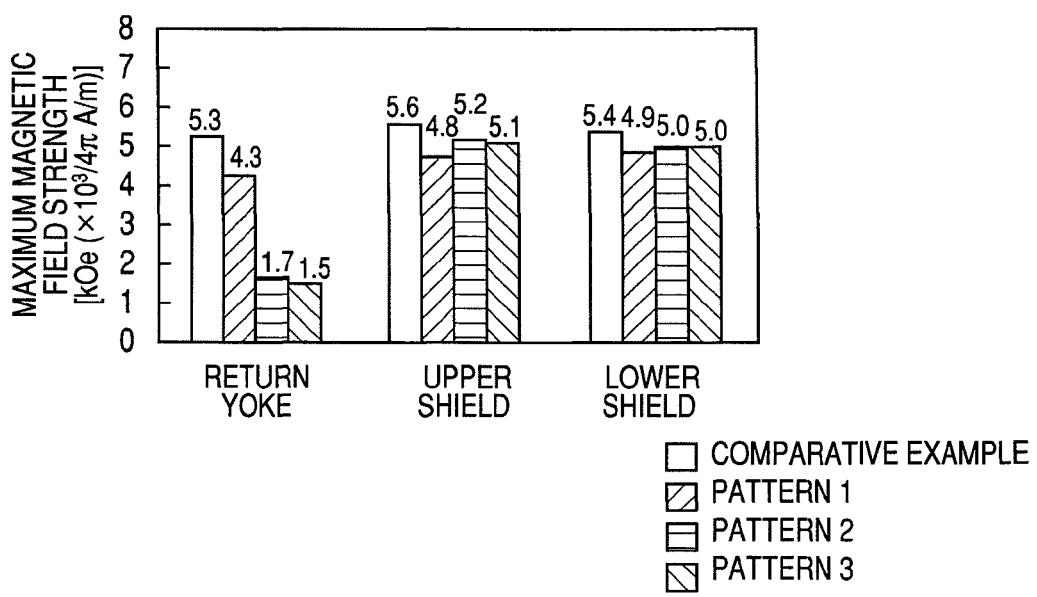
FIG. 11B is a diagram showing a maximum magnetic field strength in a track width direction for each shape of the return yoke layer and the coil insulating layer.

Next, the shape and the length in the track width direction of the coil insulating layer 26 and the return yoke layer 27 were modified as shown in FIGS. 10A to 10C. For each modification, the height directional component and the track width directional component of the magnetic field generated from the end portion in the track width direction of the return yoke layer 27 were measured. The measurement results are shown in FIGS. 11A and 11B. As a Comparative Example, the height directional component and the track width directional component of the magnetic field generated from the end portion in the track width direction of the return yoke layer 27 were measured; in this case, the coil insulating layer 26 is not extended to the end portion in the track width direction of the return yoke layer 27. The measurement results are shown in FIGS. 11A and 11B. Similarly, the height directional component and the track width directional component of the magnetic field generated from the end portion in the track width direction of the upper and lower shield layers 16 and 17 were measured. The measurement results are shown in FIGS. 11A and 11B. In this case, magnetic field of 100 Oe ($\times 10^3/4\pi$ A/m) was applied as the external magnetic field. The magnetic field strength was measured in the same manner as described above.

In the shape (Pattern 1) shown in FIG. 10A, the length in the track width direction of the coil insulating layer 26 is larger than the length of the portion of the return yoke layer 27 exposed from the medium facing surface and extending to the end portion E. In the shape (Pattern 2) shown in FIG. 10B, the length in the track width direction of the coil insulating layer 26 is larger than the length of the portion of the return yoke layer 27 exposed from the medium facing surface and extending to the end portion E, and the width of the return yoke layer 27 gradually increases as it goes toward the starting point of the height direction; that is the front edge cut is formed in the return yoke layer 27. In the shape (Pattern 3) shown in FIG. 10C, the length in the track width direction of the coil insulating layer 26 is larger than the length of the portion of the return yoke layer 27 exposed from the medium facing surface and extending to the end portion E, and the width of the return yoke layer 27 gradually increases as it goes toward the starting point of the height direction; that is the front edge cut is formed in the return yoke layer 27. In this case, the width of the coil insulating layer 26 also gradually increases as it goes toward the starting point of the height direction.

As can be seen from FIGS. 11A and 11B, by configuring the length in the track width direction of the coil insulating layer 26 such that it is larger than the length of the portion of the return yoke layer 27 exposed from the medium facing surface and extending to the end portion E, the height directional component and the track width directional component of the magnetic field generated from the end portion of the return yoke layer 27 were suppressed compared to the Comparative Example, which did not adopt such a configuration. Similarly, the height directional component and the track width directional component of the magnetic field generated from the upper and lower shield layers 16 and 13 were also suppressed.

For the shape of Pattern 1 shown in FIG. 10A, suppression of the magnetic field attributable to the edge write phenomenon is thought to be due to the fact that because the end portion in the track width direction of the return yoke layer 27 has a 3-dimensional structure where demagnetizing field is large, concentration of magnetic flux is suppressed. For the shapes of Patterns 2 and 3 shown in FIGS. 10B and 10C, suppression of the magnetic field attributable to the edge write phenomenon in the height direction and the track width direction is thought to be due to the fact that because the substantially arch-like shape is provided to the end portion in the track width direction of the return yoke layer 27, the same effect of improving the resistance to the external magnetic field in the height direction, and that the front edge cut suppresses the concentration of magnetic flux with respect to the magnetic field applied in the track width direction.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:

1. A perpendicular magnetic recording head comprising: a magnetic layer that has a main magnetic pole on a surface facing a recording medium;

a return yoke layer that is disposed on the magnetic layer with a nonmagnetic layer disposed therebetween and has a width in a track width direction that is larger than the corresponding width of the main magnetic pole; and a coil layer that applies a recording magnetic field to the magnetic layer, wherein the return yoke layer is provided with such a shape that as seen in the plan view, the return yoke layer is exposed from the medium facing surface with a width not greater than the width in the track width direction of a protrusion region of the return yoke layer that covers the coil layer and the width of the return yoke layer in the track width direction gradually increases in the height direction from the medium facing surface.

2. The perpendicular magnetic recording head according to claim 1, wherein the return yoke layer is provided with such a shape that as seen in the plan view, a neck portion is exposed from the medium facing surface with a width and the width of the return yoke layer in the track width direction gradually increases in the height direction from the medium facing surface.

3. The perpendicular magnetic recording head according to claim 1, wherein an insulating layer is disposed between the return yoke layer and the coil layer, and the insulating layer extends to or the vicinity of the end portion in the track width direction of the return yoke layer that is exposed from the medium facing surface.

4. The perpendicular magnetic recording head according to claim 3, wherein the insulating layer is provided with such a shape that the width of the insulating layer in the track width direction gradually increases in the height direction from the medium facing surface.

* * * * *